April 9, 1929. J. P. NIELSEN Re. 17,260
PACKAGE HOLDER FOR ROLLS
Original Filed March 23, 1927
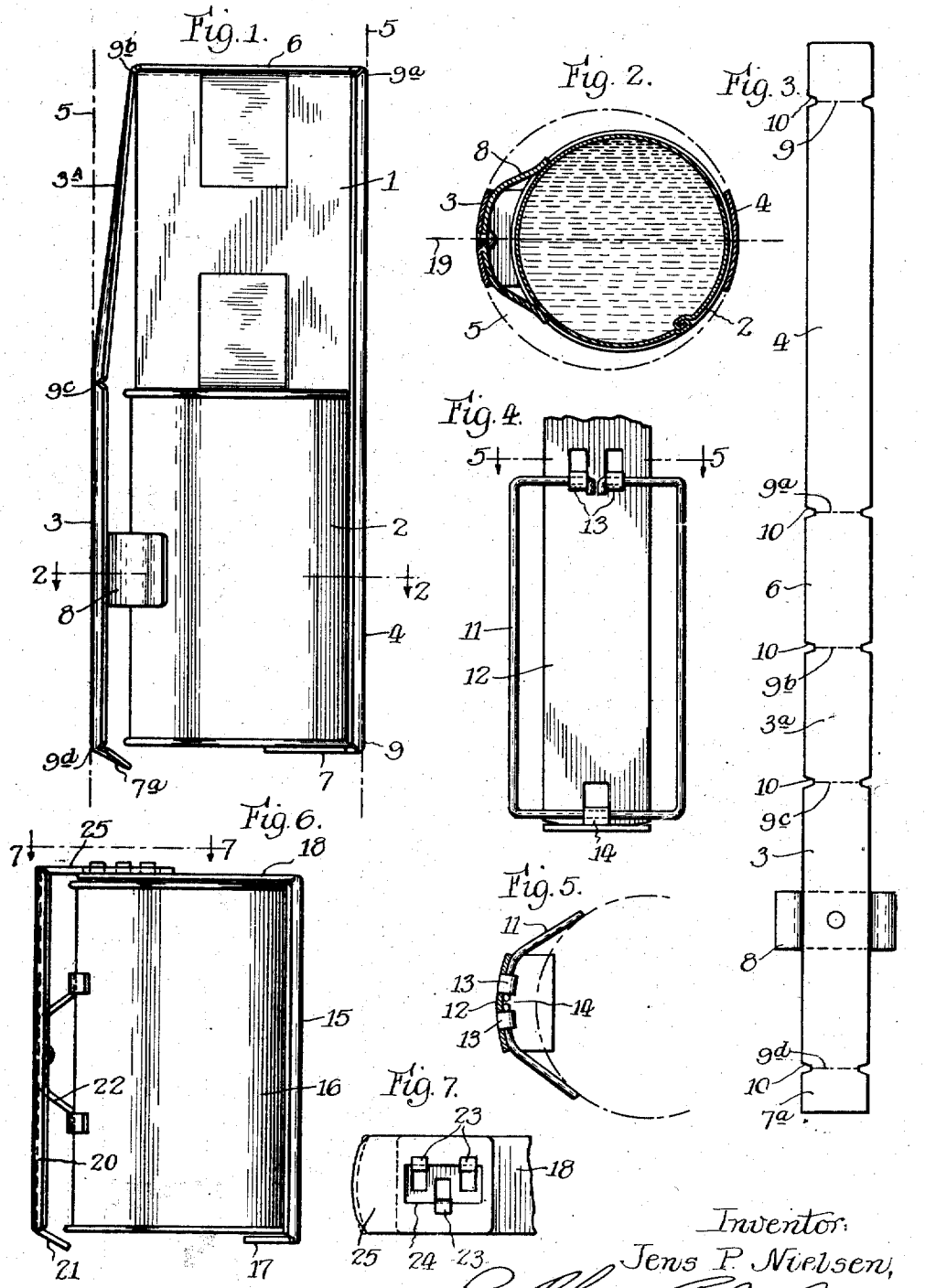
Inventor:
Jens P. Nielsen,
By Lindsell Parker & Carlson
Attys.

Reissued Apr. 9, 1929. Re. 17,260

UNITED STATES PATENT OFFICE.

JENS P. NIELSEN, OF CHICAGO, ILLINOIS, ASSIGNOR TO ARGUS MANUFACTURING COMPANY, OF CHICAGO, ILLINOIS, A CORPORATION OF ILLINOIS.

PACKAGE HOLDER FOR ROLLS.

Original No. 1,660,882, dated February 28, 1928, Serial No. 177,823, filed March 23, 1927. Application for reissue filed August 4, 1928. Serial No. 297,449.

My invention relates to means for removably retaining an object (or group of objects) within the bore of a roll or the like, as for example within the bore of a roll of roofing paper.

It has long been customary to accompany each such roll with a can of cement and a package of nails adequate for use with the paper in the roll, both the can and the package of nails being of such a size as can readily be stored and shipped within the bore of the roll. To retain such accessories within the bore of the roll, most manufacturers of roofing papers provide each such roll with end caps which close both ends of the bore and which are clamped to the ends of the roll by a rod connecting the two caps. This arrangement has proven objectionable in many cases, for the reason that it permits the packaged accessories to slide freely in the bore and often results in rupturing the carton in which the nails are packed, thereby causing the nails to damage the inner parts of the roll, and also because of the cost of such a provision.

As an alternative arrangement, package retainers have also been proposed in a form employing arms of spring wire which indent the walls of the bore of the roll; but these likewise damage the inner portions of the roll, so as to compel the user to waste a considerable portion of the paper.

My present invention also aims to provide a spring-held package retainer, one of its main objects being to provide a retainer construction which will be effective without indenting and damaging the paper, which will facilitate the insertion and withdrawal of the retainer along with the packaged accessories retained by it; which will be inexpensive; and which can be packed and shipped cheaply. Still further and also more detailed objects of my invention will appear from the following specification and from the accompanying drawings, in which Fig. 1 is an elevation of a package retainer embodying my invention, showing this as holding a can of cement and a package of nails within the bore of a roll, the wall of the bore being indicated by dotted lines.

Fig. 2 is a horizontal section, taken along the line 2—2 of Fig. 1.

Fig. 3 is an elevation of the retainer before the strap which forms the main portion of the retainer is bent along the dotted lines, showing the form in which this retainer can be packed for shipment.

Fig. 4 is an elevation of a lower portion of another retainer of the same type, showing a spring formed of wire.

Fig. 5 is a horizontal section taken along the line 5—5 of Fig. 4.

Fig. 6 is an elevation of another embodiment of my invention, namely one in which the two presser members are relatively slidable, showing this as employed for retaining a single can.

Fig. 7 is a fragmentary plan view of the retainer of Fig. 6, showing the means affording the slidable connection.

Since my invention is particularly adapted for use in retaining both a can of cement and a package of nails within the bore of a roll of roofing paper, I am illustrating and describing the same as employed for this purpose. However, I do not wish to be limited to the use of my invention for this particular purpose.

In the drawings, Fig. 1 shows a package 1 (containing the nails) seated on a can 2 (containing the cement) and disposed within a single-piece metal strap which has its shanks 3 and 4 extending at opposite sides of these two containers, with each shank engaging one of two diametrically opposite portions of the bore 5 of the roll of paper. The upper ends of the shanks 3 and 4 are connected by a strap portion 6 which extends diametrically of the roll above the package and which is somewhat shorter than the diameter of the said bore. This strap portion 6 forms the bight of the generally U-shaped strap and is disposed close to the top of the package. The shank 3 is shown provided at its free (lower) end with a stop finger 7 extending radially inward of the roll and crosswise of the can of cement, so as to co-operate with the bight 6 in preventing the two containers from moving longitudinally of the retainer. The end $7^a$ of the shank 3 is preferably bent slightly inward to prevent having the free end of the shank catch in the bore.

Secured to one side portion of the U-shaped strap (and desirably to one shank 3) is a spring 8 which engages the adjacent side of the can 2 and forcibly urges the shank 3 laterally away from the can. Thus arranged, the spring operates through the can to spread the lower ends of the shanks 3 and 4 apart, thereby forcibly pressing both of these shanks against diametrically opposite parts of the wall of the bore of the roll. The shanks 3 and 4 preferably are both of arcuate transverse sections with their outer faces curved substantially to the same radius as that of the bore, while the bight 6 and the stop finger (or fingers) 7 may be flat. The spring 8 is preferably formed so as to afford can-engaging portions spaced circumferentially of the can, as shown in Fig. 2, so that the arms of the spring cooperate with the shank 4 in gripping the can at three circumferentially spaced points, thereby preventing the can from moving in a direction at right angles to a longitudinal plane 19 medial of both of the said shanks. Moreover, the spring is of such a size that it tends to spread the shanks further apart than the diameter of the bore.

To cheapen and facilitate the packing and shipping of my retainer, I may ship this in the form shown in Fig. 3, namely with the entire strap extended and generally flat, except for the preformed transverse curving of the parts which are to form the shanks of the retainer, and with lateral indentations 10 indicating the several lines (9, $9^a$, $9^b$, $9^c$ and $9^d$) along which the strap is to be bent to its operative form. Straps made in this way, with the springs fastened to them as shown in Fig. 3, can be packed and shipped much more compactly and cheaply than when already bent to their finished shapes, and with the straps made of relatively thin material (such as galvanized iron), the user can quickly form the needed bends in them by hand at the indented points.

After each strap is thus bent up, the two containers are slipped into the resulting retainer and the latter is shoved bight foremost (or upwards in Fig. 1) into the bore of a roll. During this inserting the spring is compressed, so that it holds both shanks of the retainer against the wall of the bore with sufficient firmness to retain the assembly of retainer and packages in this bore. Then, when the roll is to be used, the said assembly can readily be pushed further in the same direction so as to force it out of the roll at the opposite end to that from which it was inserted. By using relatively thin metal for the retainer, I not only cheapen its construction, but also permit the spring to form a bend along the line $9^c$, so as to hold the shank 3 in engagement with the bore wall for the entire length of that shank, while the can distributes the pressure longitudinally of the other shank 4 so as to press the major portion of the latter shank against this bore wall. Consequently, I readily secure the desired firm anchoring of the retainer. Moreover, by employing such large bore-engaging surfaces and by constructing the said shanks of an outwardly convex transverse section as above described, I prevent the indenting of the paper, so that no part of the roll is damaged.

In practice, I desirably locate the spring considerably above the lower end of the retainer, so as to enhance the distribution of pressure along the shank 4 through the can. However, I do not wish to be limited to the details of construction and arrangement heretofore described, as many changes might be made without departing either from the spirit of my invention or from the appended claims.

For example, Figs. 4 and 5 show a spring 11 formed of wire and secured to the adjacent shank 12 and secured to the latter by upper fingers 13 and by a single lower finger 14, these fingers being all formed from the said shank.

Fig. 6 shows another embodiment of my invention, namely one in which the retainer includes two main parts arranged so as to slide on each other transversely of the bore, and shows such a retainer as used with a single object. In this embodiment, the right-hand shank 15 (which bears directly against the container 16) is integral with a lower stop arm 17 and an upper stop member 18. This member 18 has fingers 23 formed from it and projecting through a slot 24 in a companion arm 25 which extends at right angles to the left-hand shank 20 of the retainer, which latter shank has its lower end portion 21 bent slightly inward to prevent having the free end of the shank catch in the bore. In this case, the spring 22 is fastened to the shank 20 approximately opposite the mid-height of the single container.

In this embodiment of Figs. 6 and 7, the shanks 15 and 20 are presser members which bear for substantially their entire length against the bore of the roll, thereby distributing the pressure over such large areas of this bore as not to indent or damage the paper, and the fingers 23 cooperate with the slot 24 in slidably connecting the two separately formed parts of the retainer so that the action of the spring can force both of these presser members 15 and 20 against the wall of the bore.

With the embodiment of Figs. 1 and 2, the parts 3 and 4 of the single piece strap form the presser members, and the sloping disposition of the portion $3^A$ cooperates with the bends $9^b$ and $9^c$ to permit the action of the spring to spread the presser members 3 and 4 into firm engagement with the wall of the bore. In each case, the upper or transverse portion (or portions) of the retainer form the bight of a generally U-shaped retainer member, and the spring acts directly on one presser member while acting through an interposed container on the other presser member.

Since the action is substantially the same regardless of whether my retainers are used with a single object or with a plurality of superposed objects, I do not wish to be limited in this respect. Hence the term "object" is used in the appended claims in a generic sense in which it may denote one or more containers or other articles that are to be retained in the bore.

With either of the two illustrated types, I may bend up one or both stop fingers in the strap before shipping this with the remainder of the strap substantially straight, so as to have this stop finger more rigid. For example, for the form of Fig. 1 I would bend the finger 7 at right angles to the presser portion 4 before shipping the strap, and would omit the notches 10 shown in Fig. 3. Such a single end bend will only slightly increase the cost of the packing. Or I may even form both end bends before shipping the strap.

I claim as my invention:

1. Means for retaining an object in the bore of a roll or the like, comprising, a pair of presser members extending longitudinally of the bore at opposite sides of the object, each presser member having a substantially straight portion bearing against the wall of the bore, the object bearing laterally against one presser member, means connecting the presser members and arranged to engage one end of the object, one of the presser members having an extension arranged to engage the other end of the object, and compression spring means interposed between the other presser member and the object for directly pressing the said other presser member against the bore wall and for acting through the object to press the first named presser member against the opposite side of the bore wall.

2. Object-retaining means as per claim 1, in which the spring means are secured to the said other presser member.

3. Object-retaining means as per claim 1, in which the spring means are secured to the said other presser member and are arranged for engaging portions of the object spaced circumferentially of the bore.

4. Object-retaining means as per claim 1, in which each presser and a part of the connecting member, comprises an initially substantially straight metal strap having weakened portions defining lines along which the strap may be manually bent to its operative form.

5. Means for retaining an object within the bore of a roll; comprising a substantially U-shaped strap straddling the object longitudinally of the said bore and having a finger extending radially inward from the free end of one shank of the U, whereby the bight of the U cooperates with the said finger to limit longitudinal movement of the object with respect to the strap; the object having a side thereof in engagement with one shank of the U; and a compression spring secured to the other shank of the U and engaging the other side of the object; the strap being initially manufactured in a substantially straight form and provided with weakened portions indicating the lines along which it may be bent to afford the said U-shaped and finger carrying formation.

6. Means for retaining an object within the bore of a roll; comprising a metal strap having a bight extending transversely of the axis of the roll adjacent to one end of the object, and a pair of shanks disposed respectively at opposite sides of the object between the latter and the wall of the bore, the said shanks being arcuate in transverse sections to approximately fit the contour of the bore; means carried by at least one of the shanks for preventing movement of the object longitudinally of the shanks away from the bight, the object being in engagement with one of the shanks; and a compression spring interposed between the object and the other shank; the strap being so constructed as to permit relative movement of the said other shank radially of the bore with respect to the bight, thereby allowing the spring to force the said other shank against the wall of the said bore.

7. Means for retaining an object in the bore of a roll or the like, comprising, a pair of presser members extending longitudinally of the bore at opposite sides of the object, each presser member having a long and substantially straight portion bearing against the wall of the bore, the object bearing laterally against one presser member, means for connecting the presser members, and compression spring means interposed between the other presser member and the object for directly pressing the said other presser member against the bore wall and for acting through the object to press the first named presser member against the opposite side of the bore wall.

8. Means for retaining a can in the bore of a roll or the like, comprising, a pair of presser members extending longitudinally of the bore at opposite sides of the can and having portions bearing against the wall of the bore, the object bearing laterally against one presser member, means connecting the presser members, and compression spring means interposed between the other presser member and the can and having longitudinally spaced portions arcuately formed to engage the can intermediate the ends thereof.

9. A holder for retaining packages in the bore of a roll comprising, a pair of presser members extending longitudinally of the bore at the opposite sides of the package, and a spring carried on one of said members and interposed between said member and the package for pressing the package against the other member and the members against the wall of the bore.

10. A holder for retaining packages in the bore of a roll comprising, a pair of substantially straight presser members extending longitudinally of the bore at the opposite sides of the package, and a compression spring means interposed between one of said members and the package for pressing the package against the other member and the members against the wall of the bore.

11. A holder for retaining packages in the bore of a roll having, in combination, a presser member extending longitudinally of the bore at one side of the package and a spring secured intermediate its ends to said member and having longitudinally spaced end portions arranged to engage the package and press it towards the opposite wall of the bore.

12. A holder for retaining a package in the bore of a roll comprising, a pair of substantially straight presser members extending longitudinally of the bore at the opposite sides of the package and a spring interposed between one of said members and the package, said spring and the other member having portions conforming to the shape of the package adapted to prevent lateral movement of the package from the holder.

In testimony whereof, I have hereunto affixed my signature.

JENS P. NIELSEN.